United States Patent
Cantrell

(10) Patent No.: US 7,305,794 B1
(45) Date of Patent: Dec. 11, 2007

(54) FLOWER MOUNTING ASSEMBLY FOR A HEADSTONE

(76) Inventor: Gregory R. Cantrell, 505 Bull Mountain Blvd., Hodges, AL (US) 35571

( * ) Notice: Subject to any disclaimer, the term of this patent is extended or adjusted under 35 U.S.C. 154(b) by 371 days.

(21) Appl. No.: 10/989,807

(22) Filed: Nov. 17, 2004

(51) Int. Cl.
*A47G 7/02* (2006.01)

(52) U.S. Cl. .............. 47/41.12; 248/499; 248/500

(58) Field of Classification Search .............. 47/41.1, 47/41.12, 41.14, 39; 27/1; 248/499, 500, 248/510, 506, 507, 683, 205.3, 205.5, 304; 24/300, 304, 301, 115 K
See application file for complete search history.

(56) References Cited

U.S. PATENT DOCUMENTS

| | | | |
|---|---|---|---|
| 2,737,746 A * | 3/1956 | Orr | 47/41.12 |
| 3,142,934 A | 8/1964 | Mehling | |
| 3,261,126 A * | 7/1966 | Marks | 47/41.12 |
| 3,310,911 A | 3/1967 | Boser et al. | |
| 3,336,697 A * | 8/1967 | Davis | 47/41.12 |
| 3,511,461 A * | 5/1970 | Clark | 248/27.8 |
| 3,962,825 A * | 6/1976 | O'Connell | 47/41.12 |
| 4,217,729 A | 8/1980 | Cooper | |
| 4,640,045 A | 2/1987 | Nesbitt et al. | |
| 4,678,150 A * | 7/1987 | Newman et al. | 248/205.3 |
| D305,876 S | 2/1990 | Gewinner | |
| 5,072,542 A * | 12/1991 | Quackenbush | 47/41.01 |
| D332,762 S | 1/1993 | McCafferty, Jr. | |
| 5,519,966 A | 5/1996 | Cassette | |
| 6,688,040 B1 * | 2/2004 | Yang | 47/41.1 |

\* cited by examiner

*Primary Examiner*—Jeffrey L. Gellner

(57) ABSTRACT

A flower mounting assembly for a headstone includes a block that has a top side, a bottom side, a first end, a second end, a first lateral side, a second lateral side. Each of a plurality of hook members is extended into the block. A plurality of discs is provided. Each of a plurality of fasteners is attached to one of the discs for securing a respective one of the discs to a front side, back side or top edge of a headstone. Each of a plurality of clasps is attached to one of the discs. Each of a plurality of bands is attached to and extended between one of the hook members and one of the clasps so that the bottom side of the block is abutted against and secured to the headstone. A plurality of flowers is extended into said top side of said block.

8 Claims, 4 Drawing Sheets

FLOWER MOUNTING ASSEMBLY FOR A HEADSTONE

BACKGROUND OF THE INVENTION

1. Field of the Invention

The present invention relates to headstone flower mounting devices and more particularly pertains to a new headstone flower mounting device for supporting and displaying one or more flowers on top of a headstone in a manner that prevents the flowers from falling down or being blown away from the headstone.

2. Description of the Prior Art

The use of headstone flower mounting devices is known in the prior art. U.S. Pat. No. 6,640,045 describes a container having a pair of grips thereon for coupling the container to headstone. Flowers may be positioned in the container. Another type of headstone flower mounting device is U.S. Pat. No. 3,511,461 which includes flower canister gripping members that are attachable to a headstone. A similar device is found in U.S. Pat. No. 5,519,966 which includes a flower holder container having a strap attached thereto which is extendable around a headstone. A bracket assembly is shown in U.S. Pat. No. 3,310,911 which is adapted for holding a flower container to a headstone.

While these devices fulfill their respective, particular objectives and requirements, the need remains for a device is more readily retrofitted to existing headstones and which is easily attached to, or removed a headstone. The device should be constructed of a material that easily accepts individual flowers and flower arrangements and retains in such a manner that they are not blown off of a headstone.

SUMMARY OF THE INVENTION

The present invention meets the needs presented above by comprising a block that has a top side, a bottom side, a first end, a second end, a first lateral side, a second lateral side. Each of a plurality of hook members is extended into the block. A plurality of discs is provided. Each of a plurality of fasteners is attached to one of the discs and is adapted for releasably securing a respective one of the discs to a front side, back side or top edge of a headstone. Each of a plurality of clasps is attached to one of the discs and is positioned oppositely with respect to the fasteners. Each of a plurality of bands is attached to and extended between one of the hook members and one of the clasps so that the bottom side of the block is abutted against and secured to the headstone. A plurality of flowers is extended into said top side of said block.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
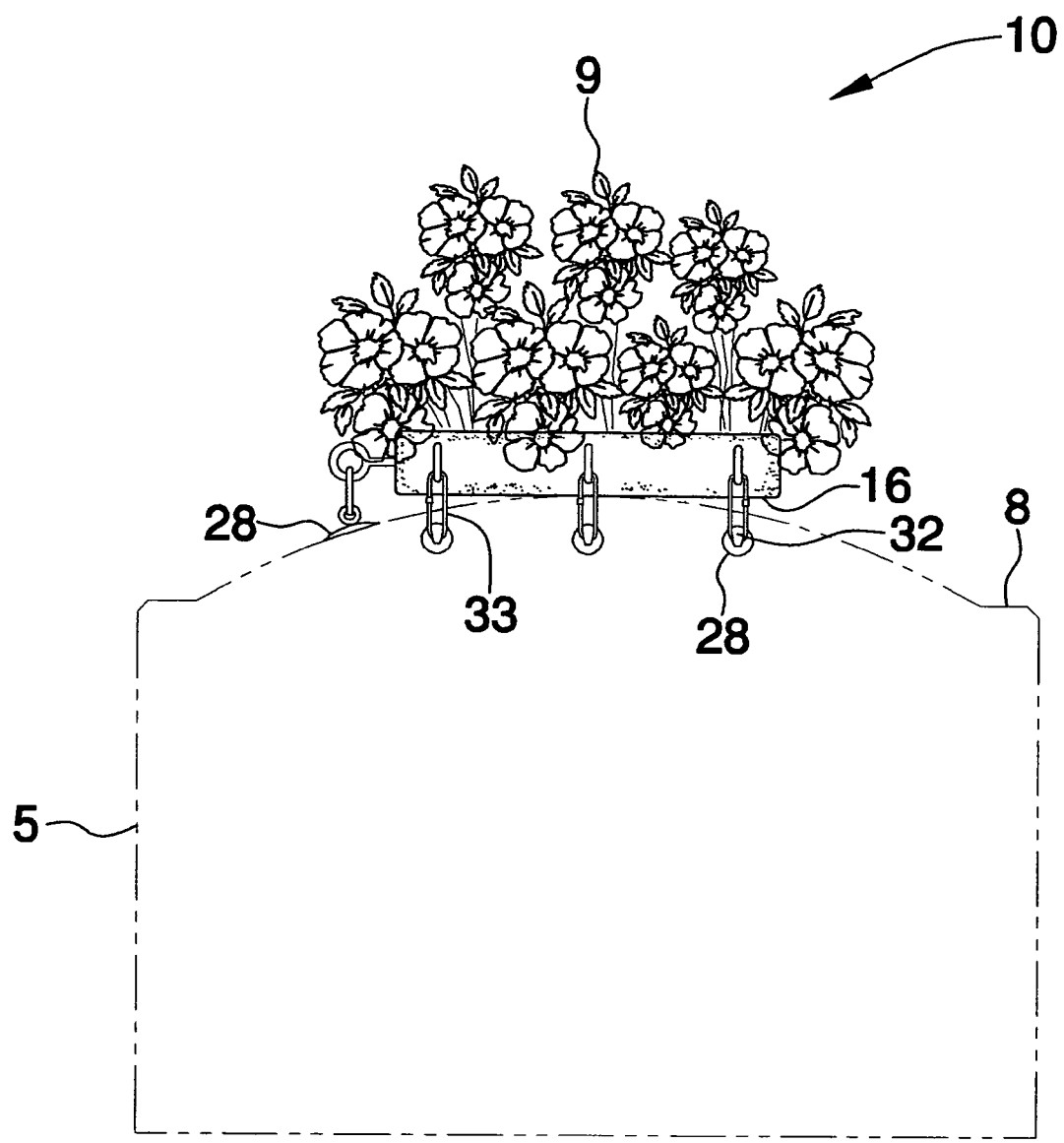
FIG. 1 is a front in-use view of a flower mounting assembly for a headstone according to the present invention.
Figure 2:
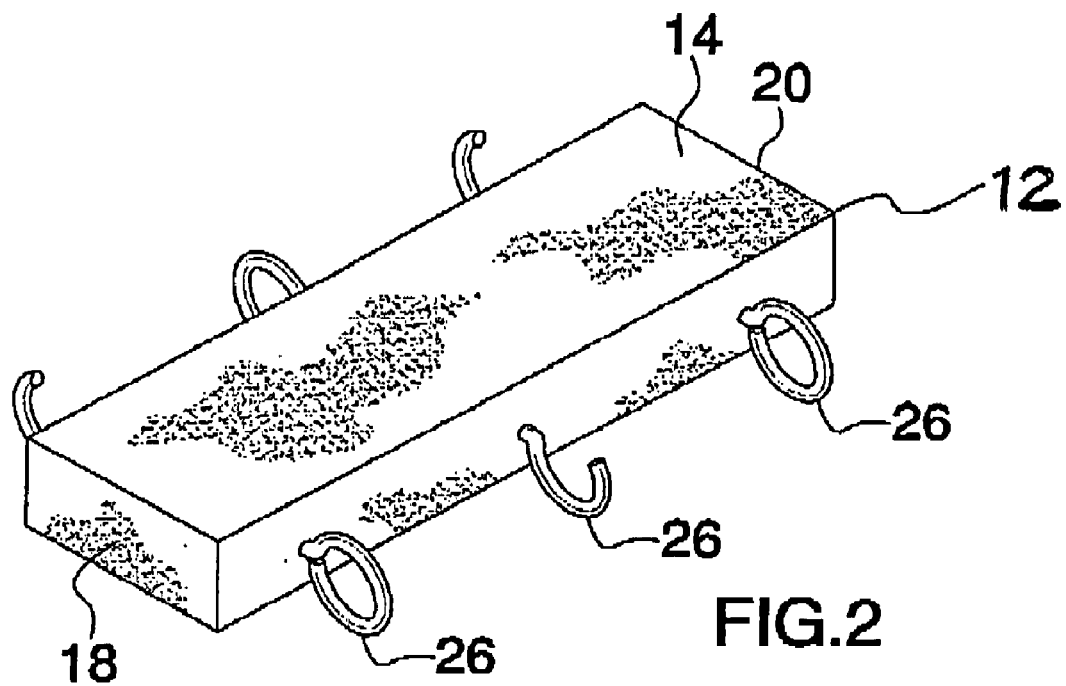
FIG. 2 is a perspective view of a block of the present invention.
Figure 3:
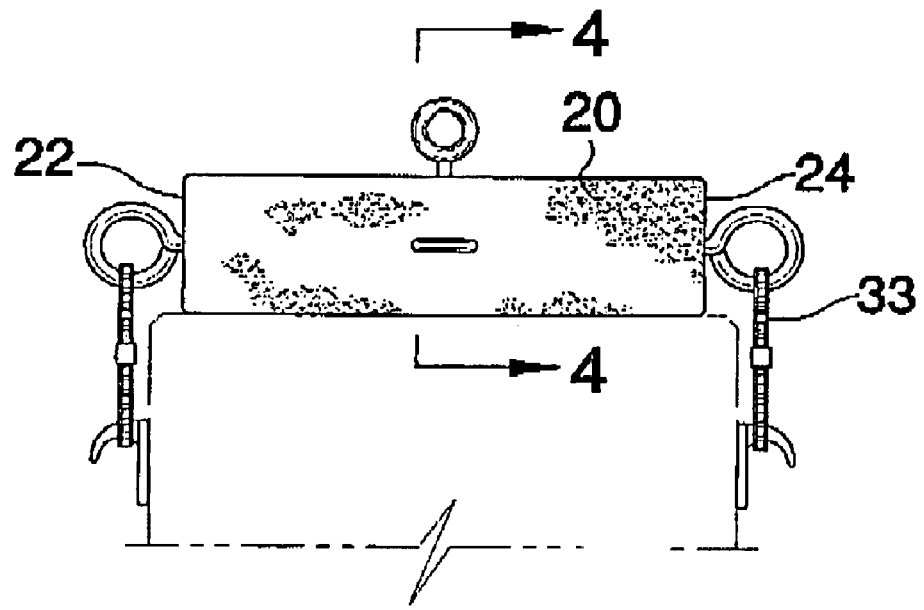
FIG. 3 is an end view of the present invention.
Figure 4:
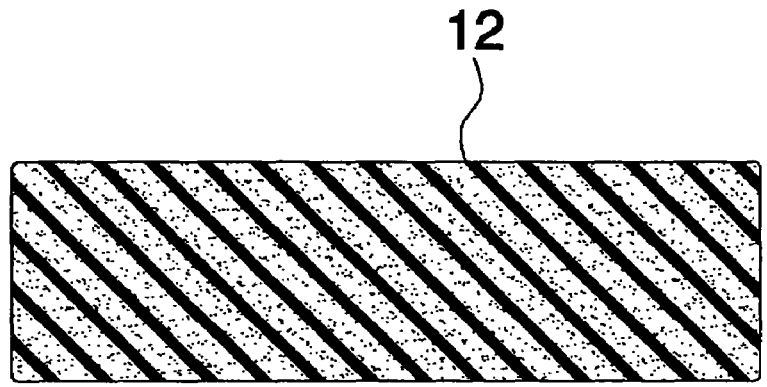
FIG. 4 is a cross-sectional view taken along line 4-4 of FIG. 3 of the present invention.
Figure 5:
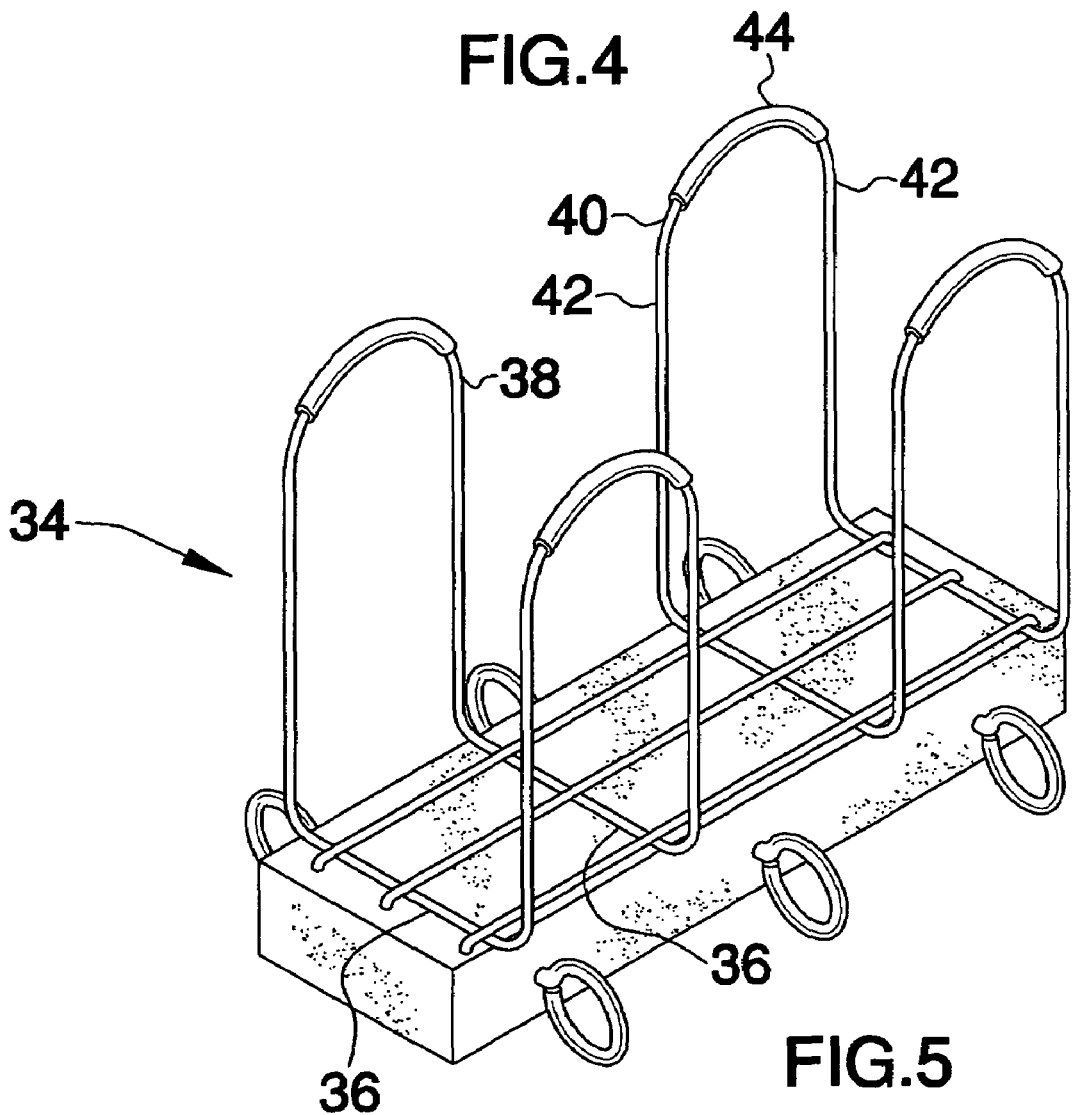
FIG. 5 is a bottom perspective view of a second embodiment of the present invention.
Figure 6:
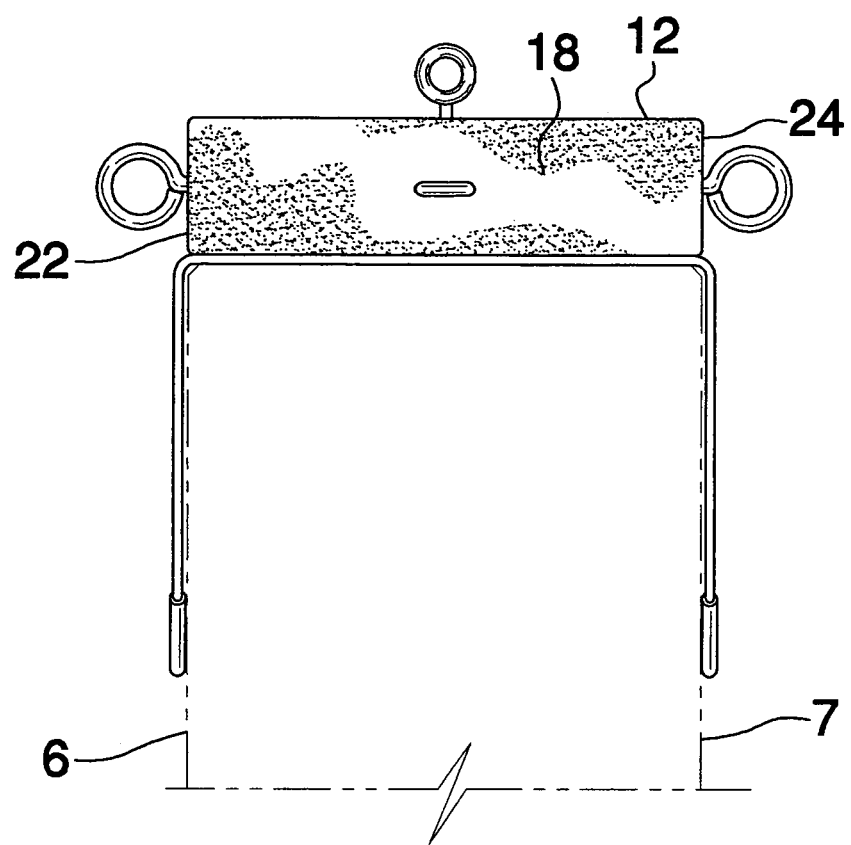
FIG. 6 is an end view of the second embodiment of the present invention.
Figure 7:
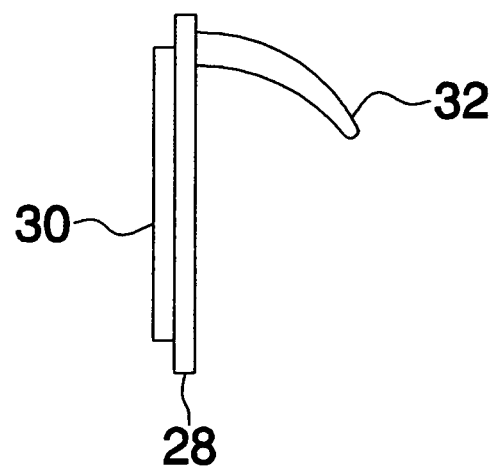
FIG. 7 is side view of a disc of the present invention.

With reference now to the drawings, and in particular to FIGS. 1 through 7 thereof, a new headstone flower mounting device embodying the principles and concepts of the present invention and generally designated by the reference numeral 10 will be described.

As best illustrated in FIGS. 1 through 7, the flower mounting assembly 10 for a headstone generally includes a block 12 that has a top side 14, a bottom side 16, a first end 18, a second end 20, a first lateral side 22, a second lateral side 24. The block 12 is comprised of foamed plastic material, such as Styrofoam.

Each of a plurality of hook members 26 is extended into the block 12. The first 22 and second 24 lateral sides each have at least one of the hook members 26 attached thereto and preferably up to at least three hook members 26 is positioned in each of the first 22 and second 24 lateral sides. Additionally, hook members 26 may be positioned on each of the first 18 and 20 second ends. The hook members 26 may be added or removed as needed by extending them into the block 12. A plurality of discs 28 is provided as well as a plurality of fasteners 30. Each of the fasteners 30 is attached to one of the discs 28 and is adapted for releasably securing a respective one of the discs 28 to a front side 6, back side 7 or top edge 8 of the headstone 5. Each of the fasteners 30 preferably comprises an adhesive. Each of plurality of clasps 32 is attached to one of the discs 28 and is positioned oppositely with respect to the fasteners 30. The fasteners 30 and the hook members 26 may each include loops, hooks, or a combination thereof. Once the discs 28 are attached to the headstone 5, each of a plurality of bands 33 is attached to and extends between one of the hook members 26 and one of the clasps 32 so that the bottom side 16 of the block 12 is abutted against and secured to the headstone 12. The bands 33 may be comprised of either a plastic material or an elastomeric material.

A clamp 34 includes a pair of rods 36 that are attached to the bottom side 16 of the block 12 and extends from the first lateral side 22 to the second lateral side 24. Each of a pair of U-shaped members 38 includes a central portion 40 and a pair of upwardly extending legs 42. Each of the legs 42 is attached to one of the rods 36. The headstone 5 is removably positionable between the U-shaped members 38 and the U-shaped members 38 hold the block 12 to the headstone 5. As shown in Figure, a pair of U-shaped members 38 may be used. An elastomeric coating 44 is positioned on each of the central portions 40 of the U-shaped members 38 to provide greater friction between the U-shaped members 38 and the headstone 5.

In use, the block 12 is attached to the headstone 5 as indicated above. The clamps 34 may be used by themselves, though they are preferably used in conjunction with the hook members 26 and clasps 32. Once attached to the headstone 5, flowers 9 are insertable into the top side 8 of the block 12. The block 12 ensures that the flowers 9 do not fall away from the headstone 5.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flower mounting assembly comprising in combination:
   a headstone having an upper edge, a front side and a back side;
   a block having a top side, a bottom side, a first end, a second end, a first lateral side, a second lateral side;
   a plurality of hook members being extended into said block;
   a plurality of discs;
   a plurality of fasteners, each of said fasteners being attached to one of said discs and being adapted for releasably securing a respective one of said discs to the front side, back side or top edge of the headstone;
   a plurality of clasps, each of said clasps being attached to one of said discs and being positioned oppositely with respect to said fasteners;
   a plurality of bands, each of said bands being attached to and extending between one of said hook members and one of said clasps such that said bottom side of said block is abutted against and secured to the headstone; and
   wherein a plurality of flowers may be extended into said top side of said block.

2. The assembly according to claim 1, wherein said block is comprised of foamed plastic material.

3. The assembly according to claim 1, wherein each of said first and second lateral sides has at least one hook member attached thereto.

4. The assembly according to claim 3, wherein each of said first and second lateral sides having at least three hook members attached thereto.

5. The assembly according to claim 1, wherein each of said fasteners comprises an adhesive.

6. The assembly according to claim 1, further including a clamp being attached to said bottom side of said block and being adapted for positioning on the headstone.

7. The assembly according to claim 6, wherein said clamp includes a pair of rods being attached to said bottom side of said block and extending from said first lateral side to said second lateral side, each of a pair of U-shaped members including a central portion and a pair of upwardly extending legs, each of said legs being attached to one of said rods, wherein the headstone is removably positionable between said U-shaped members, an elastomeric coating being positioned on each of said central portions of said U-shaped members.

8. A flower mounting assembly comprising in combination:
   a headstone having an upper edge, a front side and a back side;
   a block having a top side, a bottom side, a first end, a second end, a first lateral side, a second lateral side, said block being comprised of foamed plastic material;
   a plurality of hook members being extended into said block such that each of said first and second ends and said first and second lateral sides each have at least one hook member attached thereto;
   a plurality of discs;
   a plurality of fasteners, each of said fasteners being attached to one of said discs and being adapted for releasably securing a respective one of said discs to the front side, back side or top edge of the headstone, each of said fasteners comprising an adhesive;
   a plurality of clasps, each of said clasps being attached to one of said discs and being positioned oppositely with respect to said fasteners;
   a plurality of bands, each of said bands being attached to and extending between one of said hook members and one of said clasps such that said bottom side of said block is abutted against and secured to the headstone;
   a clamp including a pair of rods being attached to said bottom side of said block and extending from said first lateral side to said second lateral side, each of a pair of U-shaped members including a central portion and a pair of upwardly extending legs, each of said legs being attached to one of said rods, wherein the headstone is removably positionable between said U-shaped members, an elastomeric coating being positioned on each of said central portions of said U-shaped members; and
   wherein a plurality of flowers may be extended into said top side of said block.

* * * * *